Nov. 8, 1938.  S. CLARK  2,135,867
FEEDER
Filed March 30, 1933  2 Sheets-Sheet 1
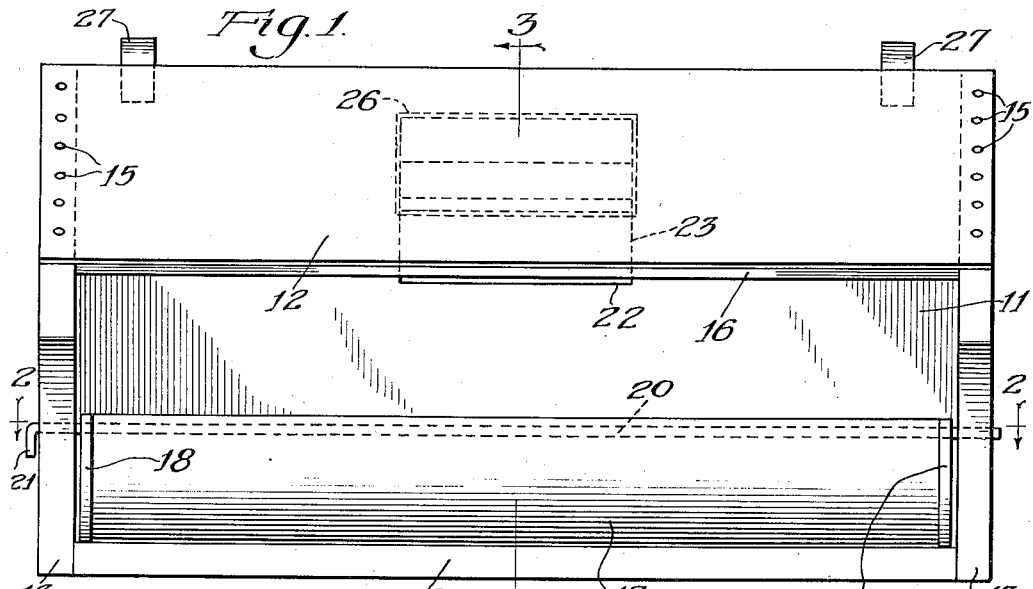
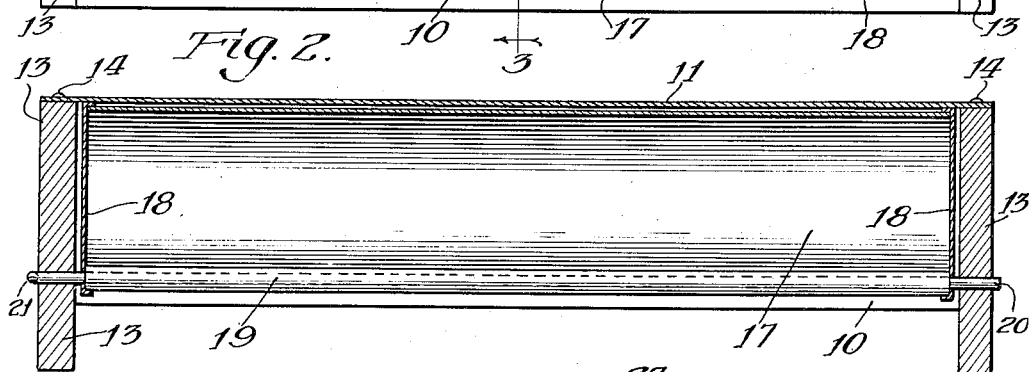
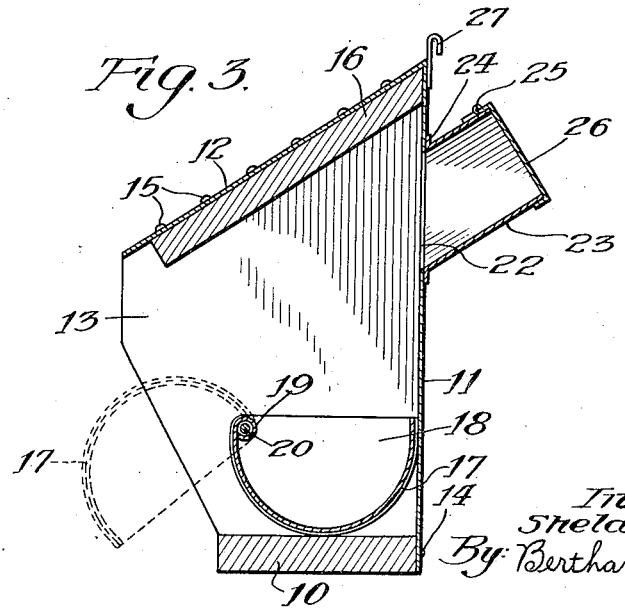
Inventor:
Sheldon Clark,
By Bertha L. MacGregor
Attorney Nov. 8, 1938.  S. CLARK  2,135,867
FEEDER
Filed March 30, 1933  2 Sheets-Sheet 2
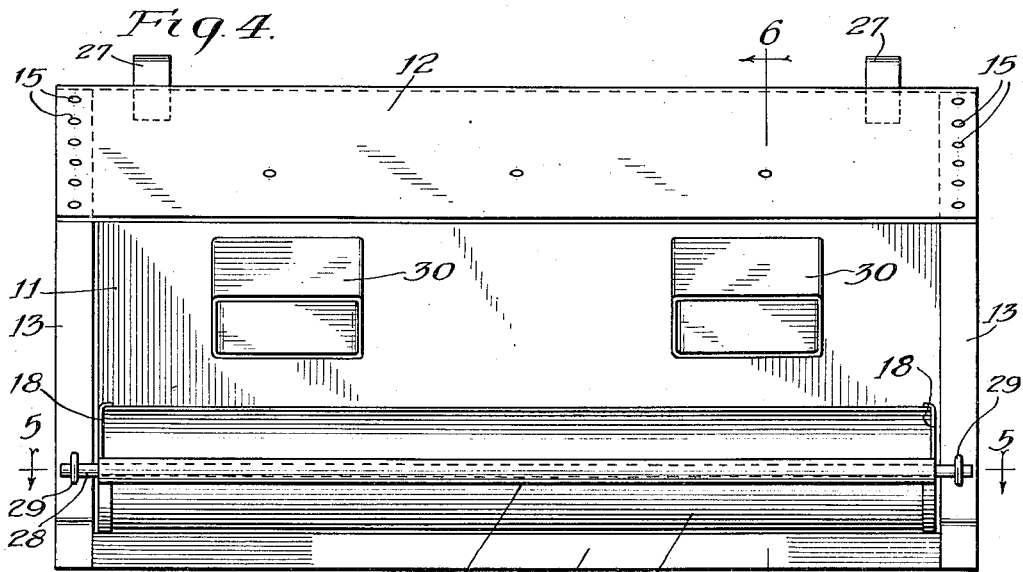
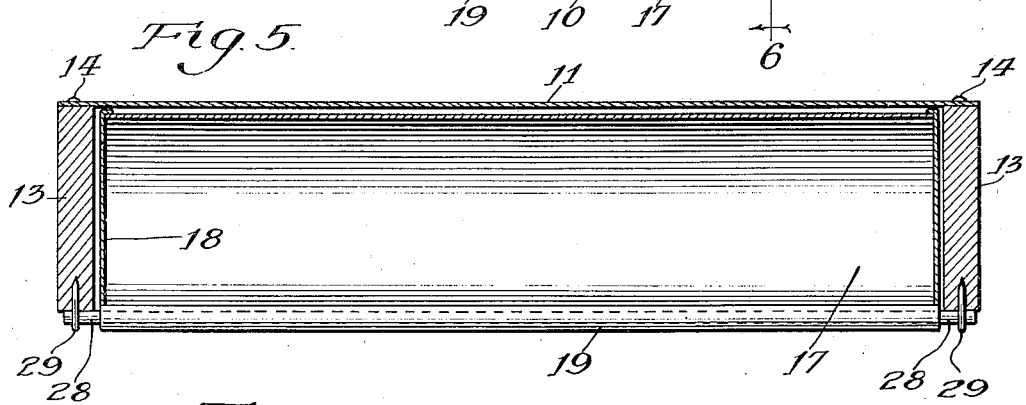
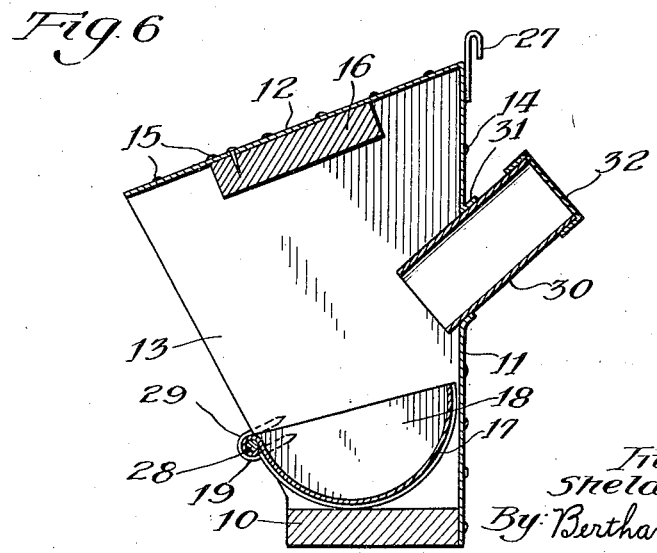
Inventor:
Sheldon Clark,
By Bertha L. MacGregor
Attorney Patented Nov. 8, 1938

2,135,867

UNITED STATES PATENT OFFICE 2,135,867

FEEDER

Sheldon Clark, Chicago, Ill.

Application March 30, 1938, Serial No. 198,805

6 Claims. (Cl. 119—52)

This invention relates to animal feeders, particularly adapted for game bird feeding. Feeders embodying my invention are designed to keep the feed dry, and to be mounted within a coop or enclosure in such manner that the feed may be poured into the feeders from outside the enclosure without disturbing the birds.

Another object is to provide a feed trough which is so mounted in a housing that the trough may be completely emptied and cleaned conveniently.

In the drawings:

Fig. 1 is a front elevation of a feeder embodying my invention.

Fig. 2 is a horizontal section on the line 2—2 of Fig. 1.

Fig. 3 is a transverse vertical section on the line 3—3 of Fig. 1.

Fig. 4 is a front elevation of a modification of my invention.

Fig. 5 is a horizontal section on the line 5—5 of Fig. 4.

Fig. 6 is a transverse vertical section on the line 6—6 of Fig. 4.

Referring to Figs. 1 to 3, inclusive, the feeder comprises a bottom 10, preferably made of wood, a rear wall 11, forwardly and downwardly inclined top 12, and end walls 13, 13. Preferably the rear 11 and top 12 are integral and made of metal, and the end walls 13 of wood, with the side edges of the metal portions overlying the edges of the wooden end walls 13 to which the rear wall 11 is connected by nails or rivets 14 and to which the top wall 12 is connected by nails or rivets 15. The metal top wall 12 may be reinforced by a wooden strip 16 located beneath the top 12. The top 12 is wider than the bottom 10 and overhangs it to protect the interior of the housing and contents. The housing described is sufficiently heavy to be not easily displaced, and the selection of materials insures tight joints and promotes dryness and protection of the feed.

A trough comprises a piece of curved metal 17, semi-circular in cross section, with a vertical wall 18 secured to each end. The curved body portion 17 of the trough is provided with a longitudinally extending, inturned lip 19 on the front edge of the trough, which forms a pocket substantially round in cross section, in which is mounted a rod 20 somewhat longer than the trough and adapted for removable mounting in apertures in the end walls 13, 13, of the housing, adjacent the forward edges of said walls 13, 13. The parts 19 and 20 are approximately in the vertical plane of the forward edge of the bottom 10. The rod 20 preferably has a downturned end 21 to facilitate insertion and withdrawal of the rod 20.

The rear wall 11 is cut away at 22 and has attached to its outer surface, adjacent the cut edges, a spout 23 which is inclined downwardly toward the rear wall 11 and is rigidly secured thereto as indicated at 24. The open upper end of the spout 23 has hinged to its upper wall, at 25, a closure cap 26 which prevents moisture from entering the spout and feed trough. A pair of hooks 27 permit the feeder to be supported by a wire fence or parts of a coop or other enclosure.

The location of the trough in the housing is such that the feed may be dropped into it without waste through the spout 23. The pivotal mounting of the trough by means of the rod 20 and lip 19 on the forward edge of the trough permits the trough to be completely emptied and cleaned, and also to be removed if desired.

In Figs. 4 to 6, inclusive, the modified form of feeder embodies the parts 10 to 19, inclusive, of the housing and trough substantially as heretofore described, excepting that the lip 19 on the forward edge of the trough is turned outwardly and downwardly instead of inwardly and downwardly, as in Figs. 1 to 3. The trough is mounted on the forward edges of the side walls 13 by means of a straight rod 28 extending through the pocket formed by the lip 19 and having its ends retained in U-shaped staples 29 secured in the walls 13.

Two spouts 30 extend through cut away portions of the rear wall 11, and are inclined downwardly and forwardly, extending into the housing to overhang the trough 17. In this form, the edges 31 of the rear wall 11 overlie the spout 30 intermediate its ends and provide a tight joint which may be soldered. A cap 32 may be frictionally held on the upper open end of each spout or hinged thereto, as desired. Hooks 27 are also provided for the purpose heretofore stated.

The only movable part of my construction is the trough. The housing and spout are rigidly connected and so constructed as to protect the trough and contents.

Changes may be made in details of construction and materials specified without departing from the scope of my invention.

I claim:

1. A feeder comprising a housing having a bottom wall, a vertical rear wall connected to the bottom wall, a top extending forwardly and downwardly from the upper edge of the rear wall and overhanging the bottom, end walls secured to the rear, top and bottom walls, a trough having a longitudinally extending lip on its forward edge, a rod extending through the pocket formed by the lip and mounted in said end walls for pivotally mounting the trough in the housing, a spout rigidly mounted on the rear wall of the housing for delivering feed to the trough, and a cover for the outer end of the spout.

2. A feeder comprising a housing having a bottom wall, a vertical rear wall connected to the bottom wall, a top extending forwardly and downwardly from the upper edge of the rear wall and overhanging the bottom beyond the forward edge of the bottom, end walls secured to the rear, top and bottom walls, a trough having a longitudinally extending lip on its forward edge, a rod extending through the pocket formed by the lip and mounted in said end walls for pivotally mounting the trough in the housing, the pivotal connection being approximately in the vertical plane of the forward edge of the bottom whereby when the trough is inverted the contents will not fall on the bottom of the housing, a spout rigidly mounted on the rear wall of the housing for delivering feed to the trough, and a cover for the outer end of the spout.

3. A feeder comprising a housing having a bottom wall, a vertical rear wall connected to the bottom wall, a top extending forwardly and downwardly from the upper edge of the rear wall and overhanging the bottom, end walls secured to the rear, top and bottom walls, a trough pivotally mounted in said end walls within the housing, the trough being invertible to a position outside of the housing, and a spout rigidly mounted on the rear wall of the feeder for delivering feed to the trough when the trough is in normal position.

4. A feeder comprising a housing having a bottom wall, a vertical rear wall connected to the bottom wall, a top extending forwardly and downwardly from the upper edge of the rear wall and overhanging the bottom, end walls secured to the rear, top and bottom walls, a trough pivotally mounted in said end walls within the housing, the trough being invertible to a position outside of the housing, and a spout rigidly mounted on the rear wall of the feeder for delivering feed to the trough when the trough is in normal position, the spout being rectangular in cross section and downwardly and forwardly inclined, and a cover for the outer end of the spout hinged to its upper wall.

5. A feeder comprising a housing having a bottom wall, a vertical rear wall connected to the bottom wall, a top integral with and extending forwardly and downwardly from the upper edge of the rear wall and overhanging the bottom, end walls secured to the rear, top and bottom walls, said rear and top walls overlying the top and rear edges of the end walls, a trough having a longitudinally extending lip on its forward edge, a rod extending through the pocket formed by the lip and mounted in said end walls for pivotally mounting the trough in the housing, a spout rigidly mounted on the rear wall of the feeder for delivering feed to the trough, a cover for the outer end of the spout, and hooks on the upper edge of the rear wall for mounting the feeder on a vertical support.

6. A feeder comprising a housing having a bottom wall, a vertical rear wall connected to the bottom wall, a top extending forwardly from the upper edge of the rear wall and overhanging the bottom, end walls secured to the rear, top and bottom walls, a trough having a longitudinally extending lip on its forward edge, a rod extending through the pocket formed by the lip, U-shaped staples in the forward edges of said end walls for receiving the ends of the rod and for pivotally mounting the trough in the housing, a spout rigidly mounted on the rear wall of the feeder for delivering feed to the trough, and a cover for the outer end of the spout.

SHELDON CLARK.